(12) United States Patent
Van Der Eerden et al.

(10) Patent No.: US 12,454,417 B2
(45) Date of Patent: Oct. 28, 2025

(54) CONVEYOR BELT MODULE WITH RELATIVELY NARROW SURFACES

(71) Applicants: Marel Poultry B.V., Av Boxmeer (NL); Ammeraal Beltech Modular A/S, Vejle (DK)

(72) Inventors: Harry Van Der Eerden, AV Boxmeer (NL); Germ Buter, Vejle (DK); Kenneth Westergaard Andersen, Vejle (DK)

(73) Assignees: Marel Poultry B.V., Av Boxmeer (NL); Ammeraal Beltech Modular A/S, Vejle (DK)

( * ) Notice: Subject to any disclaimer, the term of this patent is extended or adjusted under 35 U.S.C. 154(b) by 287 days.

(21) Appl. No.: 18/247,201

(22) PCT Filed: Oct. 8, 2021

(86) PCT No.: PCT/EP2021/077888
§ 371 (c)(1),
(2) Date: Mar. 29, 2023

(87) PCT Pub. No.: WO2022/074210
PCT Pub. Date: Apr. 14, 2022

(65) Prior Publication Data
US 2023/0406643 A1 Dec. 21, 2023

(30) Foreign Application Priority Data
Oct. 9, 2020 (EP) .................................... 20201185

(51) Int. Cl.
*B65G 17/06* (2006.01)
*B65G 17/08* (2006.01)

(52) U.S. Cl.
CPC ................................. *B65G 17/086* (2013.01)

(58) Field of Classification Search
CPC ...... B65G 17/06; B65G 17/064; B65G 17/086
(Continued)

(56) References Cited

U.S. PATENT DOCUMENTS

| | | | | |
|---|---|---|---|---|
| 4,153,152 A | * | 5/1979 | Lapeyre | B65G 17/086 198/852 |
| 4,934,517 A | * | 6/1990 | Lapeyre | B65G 17/086 198/852 |

(Continued)

FOREIGN PATENT DOCUMENTS

| | | |
|---|---|---|
| CN | 110546087 A | 12/2019 |
| NL | 2004116 C2 | 7/2011 |

OTHER PUBLICATIONS

International Search Report issued in Application No. PCT/EP2021/077888 mailed on Nov. 17, 2021 ( 3 pages).
(Continued)

*Primary Examiner* — Douglas A Hess
(74) *Attorney, Agent, or Firm* — Osha Bergman Watanabe & Burton LLP

(57) ABSTRACT

There is presented a conveyor belt module for a side flexing modular conveyor belt wherein a width ratio between a longitudinal surface width and a maximum width of eye parts placed centrally along a longitudinal is smaller than a width ratio for eye parts placed on both sides of the centrally placed eye parts. There is furthermore presented a modular conveyor belt, a conveyor belt system, a method for conveying one or more elements and use of modular conveyor belt for conveying one or more elements.

15 Claims, 5 Drawing Sheets

(58) Field of Classification Search
USPC .................................. 198/850, 851, 852, 853
See application file for complete search history.

(56) References Cited

U.S. PATENT DOCUMENTS

| | | | |
|---|---|---|---|
| 6,036,001 | A | 3/2000 | Stebnicki et al. |
| 7,073,662 | B2* | 7/2006 | Neely .................. B65G 17/086 198/852 |
| 7,837,029 | B2* | 11/2010 | Russell .................... C09D 5/03 198/852 |
| 8,579,104 | B2* | 11/2013 | Weiser .................. B65G 17/08 198/853 |
| 9,085,414 | B2* | 7/2015 | Sharma ................ B65G 17/086 |
| 9,663,298 | B2* | 5/2017 | MacLachlan .......... B65G 17/08 |
| 2014/0131177 | A1 | 5/2014 | Delair et al. |

OTHER PUBLICATIONS

Written Opinion issued in Application No. PCT/EP2021/077888 mailed on Nov. 17, 2021 (6 pages).
European Extended Search Report issued in European Application No. 20201185.4 mailed on Mar. 26, 2021 (8 pages).

\* cited by examiner

CONVEYOR BELT MODULE WITH RELATIVELY NARROW SURFACES

FIELD OF THE INVENTION

The invention relates to a conveyor belt module, and more particularly a conveyor belt module for a side flexing modular conveyor belt, and furthermore to a corresponding conveyor belt, a modular conveyor belt system, a method for conveying one or more elements and use of conveyor belt.

BACKGROUND OF THE INVENTION

It may generally be considered advantageous that a modular conveyor belt is durable, arranged so as to avoid or reduce contamination and/or be arranged to be easily and/or effectively cleaned.

Contamination may in general be next to inevitable, in particular when conveying food stuff, such as fish or poultry or meat, but should preferably be reduced or avoided.

The need for cleaning conveyor belts assembled from a plurality of modular conveyor belt modules is ever increasing, especially if the assembled conveyer belt is used for food stuff such as meat or vegetables. Even with often used pressure washers it is challenging to properly clean the assembled modular conveyer belt as such belt has voids, crevices, vertices or edges which may collect food stuff or other unwanted material, such as debris.

Hence, an improved conveyor belt module and a corresponding conveyor belt, a modular conveyor belt system, a method for conveying one or more elements and use of a modular conveyor belt would be advantageous, and in particular an improved conveyor belt module and a corresponding conveyor belt, a modular conveyor belt system, a method for conveying one or more elements and use of conveyor belt which improves durability, reduces contamination and/or improves cleanability, such as cleanability during cleaning with a pressure washer or a water jet would be advantageous.

SUMMARY OF THE INVENTION

It may be seen as an object of the present invention to provide a conveyor belt module and a corresponding conveyor belt, a modular conveyor belt system, a method for conveying one or more elements and use of conveyor belt, which overcomes the problems mentioned above. It may be a further object of the present invention to provide an alternative to the prior art. Thus, the above described object and several other objects are intended to be obtained in a first aspect of the invention by providing a conveyor belt module for a side flexing modular conveyor belt, said conveyor belt module comprising:

A first set of eye parts defining a first axis, and
A second set of eye parts defining a second axis,
wherein the eye parts comprise:
A primary group of eye parts,
A secondary group of eye parts, wherein the secondary group of eye parts comprises eye parts placed on both sides of the primary group of eye parts along an axis being parallel with the first axis and/or the second axis.
wherein, in a cross-sectional plane being orthogonal to a line being
orthogonal to the first axis and/or the second axis, and intersecting both of the first axis and the second axis,
a first width ratio of any eye part is given as the ratio of:
a width in a direction parallel with the first axis and/or the second axis of a surface of the eye part at a distal end in a first direction along an axis in the cross-sectional plane and being orthogonal to the first axis and/or the second axis, to
a largest width in a direction parallel with the first axis and/or the second axis of the eye part,
and a second width ratio of any eye part is given as the ratio of:
a width in a direction parallel with the first axis and/or the second axis of a surface of the eye part at a distal end in a second direction being orthogonal to the first direction, to
the largest width in a direction parallel with the first axis and/or the second axis of the eye part,
and wherein a first width ratio and/or a second width ratio is smaller for eye parts within the primary group of eye parts compared to eye parts within the secondary group of eye parts.

A possible advantage of the present invention may be that by having the first width ratio and/or the second width ratio being smaller for eye parts within the primary group of eye parts compared to eye parts within the secondary group of eye parts, i.e., for having at least one width ratio being smaller for the primary group of eye parts sandwiched between eye parts of the secondary group of eye parts, objects carried by the primary group of eye parts will have relatively little surface area contact for a given width of the carrying eye parts compared to the relatively large surface are contact for a given width of eye parts in the secondary group which interact with actuating means for driving the conveyor. It is noted that the width may scale with strength. Thus, it is achieved that there is relatively little surface area (for a given width or strength) at a middle/central/sandwiched portion of a modular conveyor belt will interact with, e.g., contaminating objects (such as fish, meat or poultry), while a relatively large surface area (for a given width or strength) will be able to interact with actuating means. This may in turn be advantageous for allowing minimal deposition of contamination due to the relatively low width ratio, easy and/or effective cleaning because the relatively low width ratio (within the primary group of eye parts) facilitates that a solvent (such as water) can more easily get in between eye parts, and more durability because the relatively large width area (within the secondary group of eye parts) yields smaller normal forces and hence less friction and hence less wear.

By 'conveyor belt module' may be understood a module which can be combined with other modules, such as other similar or identical modules, optionally by means of rods through the first axes and the second axes, to form some or all of a modular conveyor belt, such as wherein one or more surfaces of the modules form a load surface of the conveyor belt.

A center plane is spanned by:
An axis being parallel with the first axis and/or the second axis, and
An axis being orthogonal to the first axis and/or the second axis and intersecting both of the first axis and the second axis.

The conveyor belt module has a load-carrying surface, such as a load carrying surface being substantially parallel with the center plane and/or planar. The load carrying surface of a central part of the conveyor belt module (such as between outermost eye parts) may be flush with a load carrying surface of one or both outermost eye parts. The conveyor belt module may be connected to an identical conveyor belt module so that load carrying surfaces of (directly, such as with no intermediate elements) connected conveyor belt modules have a planar and uninterrupted load carrying surface in a cross-sectional plane orthogonal to the first axis and/or the second axis.

The conveyor belt module may comprise an elongated (and oriented in a direction of the first axis and/or the second axis) central beam from which the first set of eye parts are extending in a first transverse direction (in the central plane and orthogonal to the first axis and/or the second axis) and the second set of eye parts are extending in a second transverse direction (in the central plane and orthogonal to the first axis and/or the second axis) being substantially opposite, such as opposite (such as anti-parallel), to the first transverse direction.

'Conveyor belt' may generally be understood to be an endless conveyor comprising a plurality of traction elements each given by a conveyor belt module. The surface of the conveyor belt may be formed by the surface of the traction elements. The conveyor belt may be capable of, such as adapted to, follow a curved path in two or three dimensions.

A 'side flexing modular conveyor belt' is understood as is common in the art, such as wherein a plurality of, optionally similar or identical, conveyor belt modules are combined in to a conveyor belt, said conveyor belt allows turning in a plane of the conveyor belt (such as for a conveyor belt having a horizontal plane allowing turning around a vertical axis), such as at least turning with a turning radius of 100 m or less, such as 10 m or less, such as 1 m or less. Side flexing may be allowed e.g., by having at least a part of the conveyor belt module being made of a flexible, such as elastic material and/or by having the first set of eye parts and/or the second set of eye parts comprising, such as consisting of, oblong eye parts. By a side flexing modular conveyor belt may generally be understood a modular conveyor belt which can be adapted to follow a curved path.

A 'first set of eye parts' or 'a second set of eye parts' is understood as is common in the art, such as allowing a straight, rigid or flexible, rod to pass through the first or second set of eye parts.

By 'defining a first axis' or 'defining a second axis' may be understood that an axis, such as an axis through a center of the first or second set of eye parts, is defined by the first or second set of eye parts. It is encompassed that the first and/or second axis is curved. The first and/or second axis may be straight. The first axis and the second axis may be substantially parallel, such as parallel.

The first set of eye parts and/or the second set of eye parts may comprise oblong holes, such as oblong holes with a longest extension in a plane orthogonal to the first axis and/or the second axis being in a direction parallel with a line intersecting each of the first axis and the second axis (such as the holes having a horizontal major axis in a plane orthogonal to the first axis and/or the second axis in case of a conveyor belt module with the first and second axis being in the same horizontal plane).

By 'primary group of eye parts' is understood a group of eye parts sandwiched between eye parts from the second group of eye parts along an axis being parallel with the first axis and/or the second axis. The primary group of eye parts may be arranged centrally, such as on both sides of (and optionally substantially symmetrically around) a middle plane at the middle of the conveyor belt module and being orthogonal to the first axis and/or the second axis. The primary group of eye parts may span a region of the conveyor belt module suitable for carrying objects during use in a modular conveyor belt.

By 'secondary group of eye parts' is understood eye parts placed on both sides of the primary group of eye parts along an axis being parallel with the first axis and/or the second axis, such as being suitable for interacting with driving means during use of the conveyor belt module during use in a modular conveyor belt.

By 'width ratio' is understood a ratio between a width of a surface being distal with respect to a center plane and a largest width in a direction parallel with the first axis and/or the second axis of the eye parts, where the 'first' and 'second' surface widths ratios refer to the surface width ratio in each direction in each direction away from a center plane spanned by:

An axis being parallel with the first axis and/or the second axis, and

An axis being orthogonal to the first axis and/or the second axis and intersecting both of the first axis and the second axis, such as "up" and "down" for a horizontally oriented conveyor belt module.

The surface width is understood to be a width of a flat part parallel with the first axis/and or the second axis. For practical purposes (with real world roughness, tooling radii, etc.), however, it may be understood to be a width measured at a position closer to the central plane than the very most distal point with respect to the center plane. For example, the surface widths may be obtained at a position being closer to the central plane than the most distal point, such as the distance it is closer is 1%, such as 2%, such as 5%, such as 10 %, such as 20%, of a total distance from the central plane to the most distal point of the eye part (corresponding to a position being, e.g., 99% of a distance between the central plane and the most distal point away from the central plane). For example, the surface widths may be obtained at a position being closer to the central plane than the most distal point, such as the distance it is closer is 1 mm, such as 2 mm, such as 5 mm, such as 10 mm, such as 20 mm, of a total distance from the central plane to the most distal point of the eye part.

It is understood that the width ratio may be given with the surface width $w_s$ in the numerator and the largest width $w_l$ in the denominator, such as said ratio being given by $w_s/w_l$.

A low width ratio may be advantageous for a relatively small surface width (and hence area), which may in turn be relevant for minimizing a contact area between the eye parts and objects to be conveyed and/or for maximizing access for a cleaning solution (such as water) into a volume between the eye parts for a given largest width (and hence strength of the eye part). A high width ratio may be advantageous for having a relatively large surface width (and hence area) for a given largest width (and hence strength of the eye part), which may in turn be relevant for reducing wear of an actuator for driving a conveyor and/or the eye parts being in contact with said actuator. A low width ratio of an eye part may for example be achieved by having sloped sides of the eye part, such as sides sloping 45°.

By 'a first width ratio and/or a second width ratio is smaller for eye parts within the primary group of eye parts compared to eye parts within the secondary group of eye parts' is understood that a first width ratio for eye parts within the primary group of eye parts is smaller than a first width ratio for eye parts within the secondary group of eye parts and/or a second width ratio for eye parts within the primary group of eye parts is smaller than a second width ratio for eye parts within the secondary group of eye parts. Thus, on one or both sides of a center plane the width ratio will be smaller for eye parts within the (sandwiched) primary group of eye-part than for the (sandwiching) secondary group of eye parts.

By 'B smaller than A' may generally be understood that A is equal to or larger than 101% B, such as equal to or larger than 102% B, such as equal to or larger than 105% B, such as equal to or larger than 110% B, such as equal to or larger than 125% B, such as equal to or larger than 150% B, such as equal to or larger than 200% B, such as equal to or larger than 500% B, such as equal to or larger than 1000% B and/or (in case of unit being length) that A is at least 1 mm larger than B, such as at least 2 mm larger than B, such as at least 5 mm larger than B, such as at least 10 mm larger than B, such as at least 25 mm larger than B, such as at least 50 mm larger than B, such as at least 100 mm larger than B, such as at least 500 mm larger than B, such as 1000 at least mm larger than B.

In an embodiment there is presented a conveyor belt module wherein a duty ratio (which may be considered analogue to a duty cycle, such as the fraction of one period in which a signal or system is active, such as the percentage of the ratio of pulse duration, or pulse width (PW) to the total period (T) of the waveform) within the primary group of eye parts is smaller than a duty cycle within the secondary group of eye parts. The duty ratio for a group of eye parts may be understood to be a ratio, such as $w_s/w_{ep-ep}$, between the surface widths ($w_s$) of eye parts within the group of eye parts and the distance ($w_{ep-ep}$) between neighboring eye parts within the group, and/or such as $w_l/w_{ep-ep}$, between the surface widths ($w_l$) of eye parts within the group of eye parts and the distance ($w_{ep-ep}$) between neighboring eye parts within the group.

In an embodiment there is presented a conveyor belt module wherein a first distance is given for any eye part as a distance along an axis in the cross-sectional plane and being orthogonal to the first axis and/or the second axis between:

the surface of the eye part at a distal end in the first direction, and the position of the largest width in a direction parallel with the first axis and/or the second axis of the eye part, and a second distance is given for any eye part as a distance along an axis in the cross-sectional plane and being orthogonal to the first axis and/or the second axis between:

the surface of the eye part at a distal end in the second direction, and the position of the largest width in a direction parallel with the first axis and/or the second axis of the eye part, and wherein a first distance and/or a second distance is larger for eye parts within the primary group of eye parts compared to eye parts within the secondary group of eye parts.

A possible advantage may be that a larger distance entails more room for a cleaning solvent to enter into the volumes between eye parts. The first distance and the second distance may in an alternative wording be described as the (shortest) difference in distance in a direction orthogonal to a center plane from each distal surface to the widest portion of the eye part.

In an embodiment there is presented a conveyor belt module wherein a first distance is given for any eye part as a distance along an axis in the cross-sectional plane and being orthogonal to the first axis and/or the second axis between:

the surface of the eye part at a distal end in the first direction, and the position of the largest width in a direction parallel with the first axis and/or the second axis of the eye part, and a second distance is given for any eye part as a distance along an axis in the cross-sectional plane and being orthogonal to the first axis and/or the second axis between:

the surface of the eye part at a distal end in the second direction, and the position of the largest width in a direction parallel with the first axis and/or the second axis of the eye part, and wherein a first distance and/or a second distance for eye parts within the primary group of eye parts is equal to or larger than 1 mm, such as equal to or larger than 2 mm, such as equal to or larger than 3 mm, such as equal to or larger than 5 mm, such as equal to or larger than 10 mm.

A possible advantage of a relatively large distance may be that it yields more space for a cleaning solvent to enter into the volume between eye parts.

In an embodiment there is presented a conveyor belt module wherein a first distance and/or a second distance for eye parts within the primary group of eye parts is larger than to a first distance and/or a second distance for eye parts within the secondary group of eye parts. By 'A larger than B' may generally be understood that A is equal to or larger than 101% B, such as equal to or larger than 102% B, such as equal to or larger than 105% B, such as equal to or larger than 110% B, such as equal to or larger than 125% B, such as equal to or larger than 150% B, such as equal to or larger than 200% B, such as equal to or larger than 500% B, such as equal to or larger than 1000% B and/or (in case of unit being length) that A is at least 1 mm larger than B, such as at least 2 mm larger than B, such as at least 5 mm larger than B, such as at least 10 mm larger than B, such as at least 25 mm larger than B, such as at least 50 mm larger than B, such as at least 100 mm larger than B, such as at least 500 mm larger than B, such as 1000 at least mm larger than B.

In an embodiment there is presented a conveyor belt module wherein one or more eye parts are attached to a central beam, and wherein a thickness of these one or more eye parts in a direction parallel with the first axis and/or the second axis of one or more of the eye parts attached to the central beam increases in a direction away from the central beam. A possible advantage may be that it yields more space for a cleaning solvent to enter into the volume between eye parts.

In an embodiment there is presented a conveyor belt module wherein the conveyor belt module comprises central beam comprising A primary beam portion, and Secondary beam portions, wherein the secondary beam portions are placed on both sides of the primary beam portion along an axis being parallel with the first axis and/or the second axis, and wherein a first flat surface area and/or a second flat surface area per unit length in a direction parallel with the first axis and/or the second axis at a distal end in the first, respectively, second direction is larger for the secondary beam portions than for the primary beam portion.

A possible advantage may in analogy with advantages described for the eye parts be less surface area to be contaminated in the primary beam portion and/or better access for cleaning solvent, and more surface area which can reduce wear in the secondary beam portion upon contact with driving means. Less surface area per unit length in a direction parallel with the first axis and/or the second axis might be understood as a smaller length in direction orthogonal to the first axis and/or the second axis.

In an embodiment there is presented a conveyor belt module wherein one or both ends in the cross-sectional plane of eye parts in the primary group of eye parts has a shape chosen among the group comprising:
A triangle, such as a symmetric or skewed triangle, such as a symmetric triangle with a (substantially) right angle at the most distal vertex,
A semi-circle,
A quarter round,
A pointed arch,
An inflexed arch, and
A polygon having more than three sides.

Any one of these shapes may be chosen so that the smaller end of the shape yields a relatively narrow surface profile of the corresponding eye parts.

In an embodiment there is presented a conveyor belt module wherein one or both ends in the cross-sectional plane of eye parts in the secondary group of eye parts has a shape being rectangular with a surface being parallel with the first axis/and or the second axis.

Any one of these shapes may be chosen so that the smaller end of the shape yields a relatively narrow surface profile of the corresponding eye parts.

In an embodiment there is presented a conveyor belt wherein the primary group of eye parts occupies a primary distance of the conveyor belt module in a direction along the first axis and/or the second axis and towards the middle, wherein the primary distance is within 10-100 cm, such as within 20-50 cm,
and/or
wherein the secondary groups of eye parts occupies a secondary distance from each side of the conveyor belt module in a direction along the first axis and/or the second axis and towards the middle, wherein the secondary distance is within 1-20 cm, such as within 2-10 cm, such as within 3-5 cm, such as 4 cm.

A possible advantage maybe that these values are suitable for a modular conveyor belt with a section for conveying objects, such as corresponding to the primary distance, and/or a modular conveyor belt with a section for driving the modular conveyor belt, such as corresponding to the secondary distance.

In an embodiment there is presented a conveyor belt module wherein the conveyor belt module has rotational symmetry of second order around one or more of:
An axis being parallel with the first axis and/or the second axis,
An axis being orthogonal to the first axis and/or the second axis and intersecting both of the first axis and the second axis, and
An axis being orthogonal to each of.
The axis being parallel with the first axis and/or the second axis, and
The axis being orthogonal to the first axis and/or the second axis and intersecting both of the first axis and the second axis.

A possible advantage may be that the conveyor belt module can be rotated, e.g., turned upside-down, and still be mounted correctly in a modular conveyor belt (such as being "fool-proof" during installation). The rotational symmetry may be a two-fold rotational symmetry, such as a rotation symmetry where a similar or identical shape emerges upon rotation 180°. A possible advantage of two-fold rotational symmetry (e.g., around an axis being orthogonal to the first axis and/or the second axis and intersecting both of the first axis and the second axis) may be that it may enable turning the conveyor belt around, such as upside-down, which may in turn beneficial for enabling rotating a conveyor belt module 180° to allow it to be worn on another side with respect to a possibly worn out side, e.g., turning it upside down in case of a worn upper side, which then allow the previous non-worn underside to become the new ready-to-use upper side, i.e., effectively doubling a life-time of the conveyor belt module with possible associated benefits in terms of resources, economy and environment.

In an embodiment there is presented a conveyor belt module wherein the conveyor belt module comprises a monolithic element comprising at least
the first set of eye parts,
the second set of eye parts, and
the portions of material A possible advantage of this may be that strength will increase since there will be no weak joints. Another possible advantage may be that it is hygienic because there will be no joints where dirt, bacteria, etc., can attach. A monolithic conveyor belt module may for example be provided by injection moulding.

In an embodiment there is presented a conveyor belt module wherein the conveyor belt module comprises, such as consists of, polymeric material, such as a single type of polymeric material.

In an embodiment there is presented a conveyor belt module wherein the conveyor belt module comprises, such as consists of, polymeric material, such as a single type of polymeric material.

In an embodiment there is presented a conveyor belt module wherein the conveyor belt module can be joined to an identical conveyor belt module by:
Positioning the conveyor belt module and the identical conveyor belt module so that
the first axis of the conveyor belt module and the second axis of the identical conveyor belt module are coaxial,
the positions of the conveyor belt module and the identical conveyor belt module along the first axis of the conveyor belt module are similar or identical,
Inserting a rod through the first eye parts of the conveyor belt module and the second set of eye parts of the identical conveyor belt module.

According to an embodiment, there is presented a conveyor belt module for a side flexing modular conveyor belt, said conveyor belt module comprising:
a first set of eye parts defining a first axis, and
a second set of eye parts defining a second axis,
wherein in
a cross-sectional plane, being a primary cross-sectional plane, intersecting a primary outermost eye part and being orthogonal to the first axis and/or the second axis, wherein the primary outermost eye part is an eye part being placed outermost in a primary end of the conveyor belt module in a dimension defined by the first axis and/or the second axis, and/or
a cross-sectional plane, being secondary cross-sectional plane, intersecting a secondary outermost eye part and being orthogonal to the first axis and/or the second axis, wherein the secondary outermost eye part is an eye part being placed outermost in a secondary end of the conveyor belt module in a dimension defined by the first axis and/or the second axis, wherein the secondary end of the conveyor belt module is opposite the primary end of the conveyor belt module, the conveyor belt module comprises portions of material having positions, which, on both sides of a center plane spanned by:
an axis being parallel with the first axis and/or the second axis, and
an axis in the cross-sectional plane and intersecting the first axis and the second axis,
are having portions on both sides of each of:
a plane orthogonal to the center plane and comprising a first intersection between a line, such as a straight line, through the first eye parts and the cross-sectional plane, and
a plane orthogonal to the center plane and comprising a second intersection between a line, such as a straight line, through the second eye parts and the cross-sectional plane.

Additionally, there is disclosed an attachment unit, such as attachment unit for attachment to an assembled modular conveyor belt, such as for attachment to a conveyor belt module, the attachment unit defining:
a longitudinal direction,
a first transverse direction being perpendicular to each of the longitudinal direction,
a second transverse direction being perpendicular to each of the longitudinal direction and the first transverse direction,
the attachment unit comprising:
a flight part, such as for slowing down or blocking, an element;
an attachment part comprising:
a first set of protrusions comprising one or more protrusions; and
a second set of protrusions comprising one or more protrusions;
where each of the protrusions is extending away from the flight part in the first transverse direction,
where each of the first set of protrusions and the second set of protrusions comprises one or more protrusions, which each has one or more protuberances and/or cavities each extending in a longitudinal direction and/or a second transverse direction, such as a hook for engaging with a recess of the modular conveyor belt, such as of a conveyor belt module, and
wherein the first set of protrusions is off-set along the second transverse direction.

According to an embodiment, there is presented a conveyor belt module system comprising a conveyor belt module and an attachment unit, optionally connected to each other, such a conveyor belt module system, wherein one or more protuberances and/or cavities of one or more attachment units are engaging with one or more recesses and/or extensions of the one or more conveyor belt modules.

According to a second aspect, there is presented a modular conveyor belt comprising a plurality of conveyor belt modules according to the first aspect. One or more surfaces of the, optionally monolithic, conveyor belt module may be a load carrying surface of the modular conveyor belt.

According to an embodiment there is presented the modular conveyor belt being suitable for conveying food products and/or sticky products, such as non-packaged food products, such as non-packaged food products comprising animal protein, such as non-packaged food products being anyone of fish or meat or poultry. By 'suitable for conveying food products' may generally be understood that the modular conveyor belt, under normal or foreseeable conditions of use, does not transfer its constituents to food in quantities which could endanger human health, bring about an unacceptable change in the composition of the food or bring about a deterioration in the organoleptic characteristics thereof and/or that modular conveyor belt is easily cleaned and sanitized by continuous or noncontinuous techniques. By 'sticky products' may in this context be understood products which can remain attached to a surface of the modular conveyor belt even upon orienting the surface to have a horizontal normal.

According to a third aspect, there is presented a modular conveyor belt system comprising:
The modular conveyor belt according to the second aspect,
Means, such as rails or guides, for controlling a path of the modular conveyor belt, and
An actuator arranged for driving the modular conveyor belt.

According to an embodiment there is presented the modular conveyor belt system wherein the modular conveyor belt system comprises a portion wherein the modular conveyor belt is side flexing. By 'wherein the conveyor belt is side flexing' may generally be understood that the modular conveyor belt is adapted to follow a curved path, such as a path being curved in a plane spanned by:
A conveying direction, and
The first axis and/or the second axis.

According to a fourth aspect, there is presented a method for conveying one or more elements, said method comprising:
placing the one or more elements on or at the modular conveyor belt according to the second aspect or the third aspect, and
conveying the one or more elements with the modular conveyor belt.

According to an embodiment there is presented a method for conveying one or more elements wherein said one or more elements comprise food products and/or sticky products, such as non-packaged food products, such as non-packaged food products comprising animal protein, such as non-packaged food products being anyone of fish or meat or poultry.

According to a fifth aspect, there is presented use of conveyor belt according to the second aspect or the third aspect for conveying one or more elements, such as wherein said one or more elements comprise food products and/or sticky products, such as non-packaged food products, such as non-packaged food products comprising animal protein.

The first, second, third, fourth and fifth aspect of the present invention may each be combined with any of the other aspects. These and other aspects of the invention will be apparent from and elucidated with reference to the embodiments described hereinafter.

BRIEF DESCRIPTION OF THE FIGURES

The conveyor belt module and a corresponding conveyor belt and modular conveyor belt system, a method for conveying one or more elements and use of conveyor belt according to the invention will now be described in more detail with regard to the accompanying figures. The figures show one way of implementing the present invention and is not to be construed as being limiting to other possible embodiments falling within the scope of the attached claim set.

DETAILED DISCLOSURE OF THE INVENTION

Figure 1:
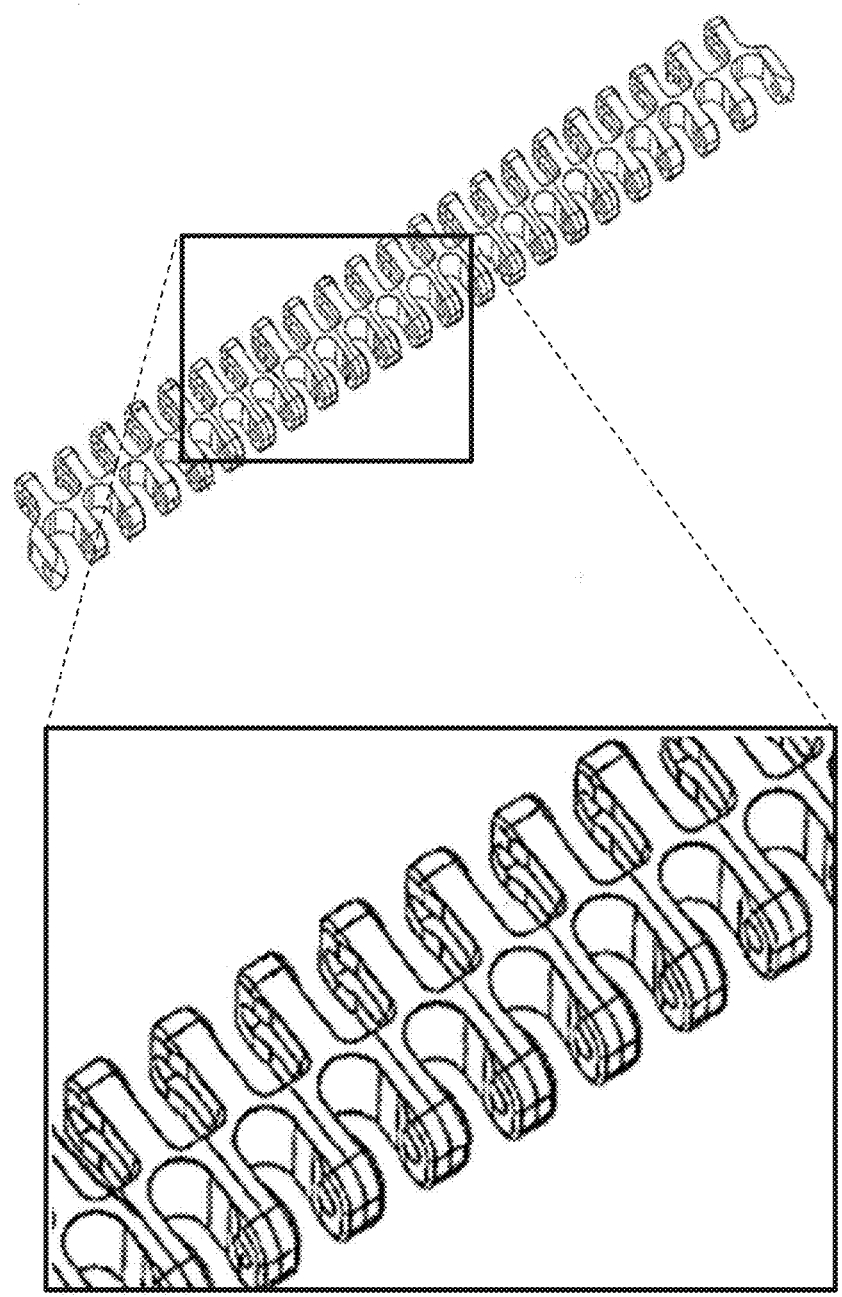
FIG. 1 illustrates conveyor belt module not encompassed by the present invention.

FIG. 1 illustrates a conveyor belt module not encompassed by the present invention, which may together with another similar or identical conveyor belt modules be assembled into a side flexing modular conveyor belt. This conveyor module will not provide a conveyor belt module with low contamination from conveyed objects and which is easy to clean, while at the same time enabling a good durability (because the width ratios of the centrally placed eye parts, cf., e.g., the central eye parts in the enlarged view in the insert, appear not smaller than width ratios of outer eye parts). Because the central width ratios are not smaller than the outer width ratios, the conveyor belt module in FIG. 1 cannot (for given strengths of the eye parts) ensure low contamination of the central conveying eye parts (in a primary group of eye parts), good cleanability of the central conveying eye parts and good durability of the outer eye parts (in a secondary group of eye parts).

Figure 2:
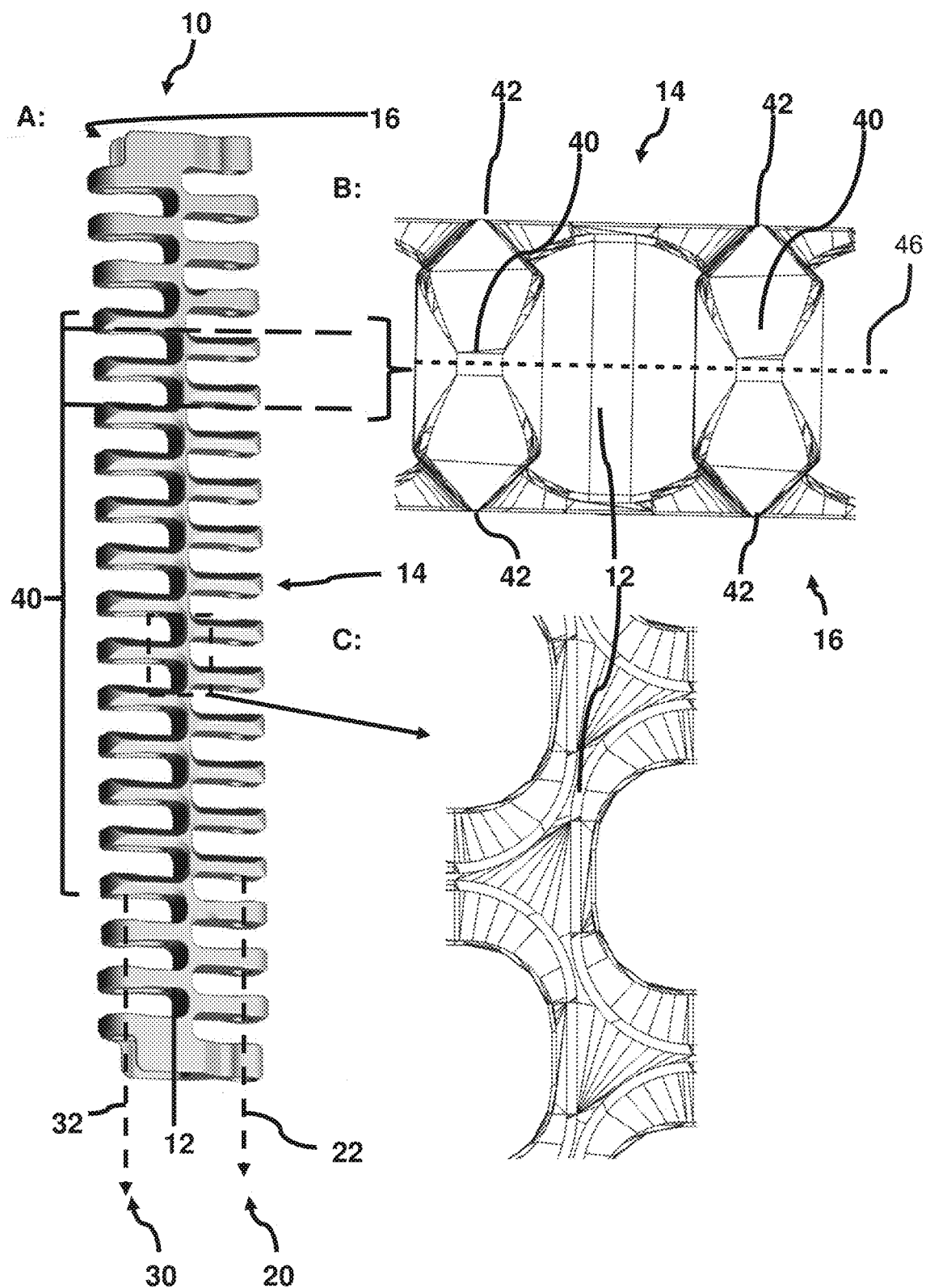
FIG. 2 illustrates conveyor belt module with an outermost eye part and portions of material.

FIG. 2 illustrates a conveyor belt module 10 with a primary group of eye parts 40 with ridges 42. The conveyor belt module 10 is adapted for being assembled into a side flexing modular conveyor belt 100 (see FIG. 3) comprising a plurality of conveyor belt modules 10. The conveyor belt module comprises:

A first set of eye parts defining a first axis 20, and

A second set of eye parts defining a second axis 30, wherein the eye parts comprise:

A primary group of eye parts 40,

A secondary group of eye parts, wherein the secondary group of eye parts comprises eye parts placed on both sides of the primary group of eye parts along an axis being parallel with the first axis and/or the second axis, wherein in a cross-sectional plane (for example including axis 20 or axis 30, such as the cross-sectional plane depicted in sub-figure B in FIG. 2);

being orthogonal to the first axis 20 and/or the second axis 30, and intersecting both of the first axis 20 and the second axis 30, the cross-sectional plane placed along an intersecting axis 46 intersecting both of the first axis 20 and the second axis 30.

a first width ratio of any eye part is given as the ratio of:

a width in a direction (such as a horizontal direction in subfigure B in FIG. 2) parallel with the first axis and/or the second axis of a surface of the eye part at a distal end in a first direction (such as an upper end in subfigure B in FIG. 2) along an axis in the cross-sectional plane and being orthogonal to the first axis and/or the second axis, to a largest width in a direction parallel with the first axis and/or the second axis of the eye part, and a second width ratio of any eye part is given as the ratio of:

a width in a direction parallel with the first axis and/or the second axis of a surface of the eye part at a distal end in a second direction (such as a lower end in subfigure B in FIG. 2) being orthogonal to the first direction, to the largest width in a direction parallel with the first axis and/or the second axis of the eye part, and wherein a first width ratio and/or a second width ratio is smaller for eye parts within the primary group of eye parts compared to eye parts within the secondary group of eye parts.

For example, in subfigure B in FIG. 2, the ridges entail that widths of both distal ends of the eye parts (within the primary group of eye parts) in the horizontal direction is substantially zero and the largest widths are non-zero and hence the first and second width ratios in the primary group of eye parts are substantially zero. There are no ridges in the (outer) eye parts in the secondary group of eye parts, which have a rather rectangular cross-section, hence the first and second width ratios for the eye parts in the secondary group are approximately unity.

Figure 3:
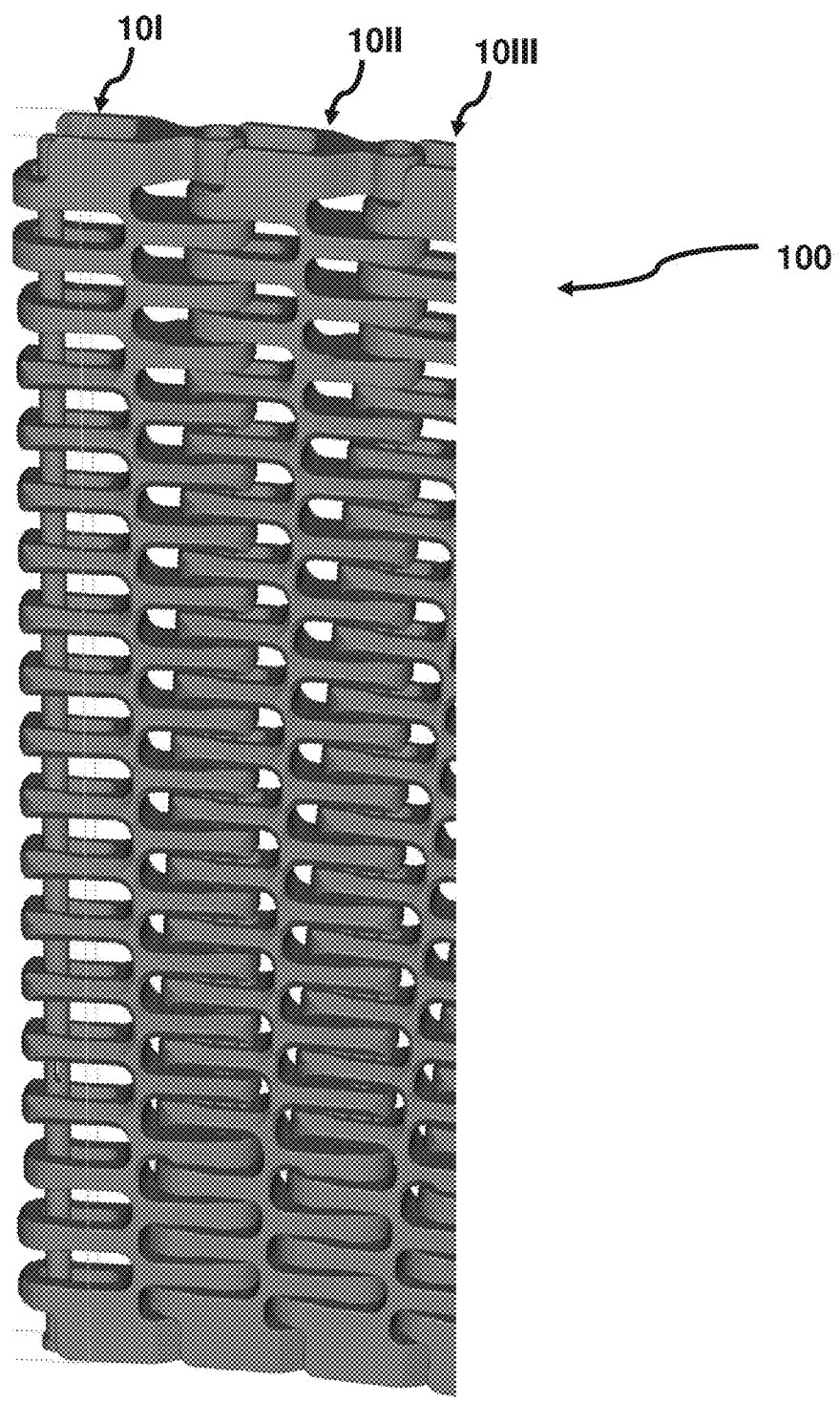
FIG. 3 illustrates a side flexing modular conveyor belt.
Figure 4:
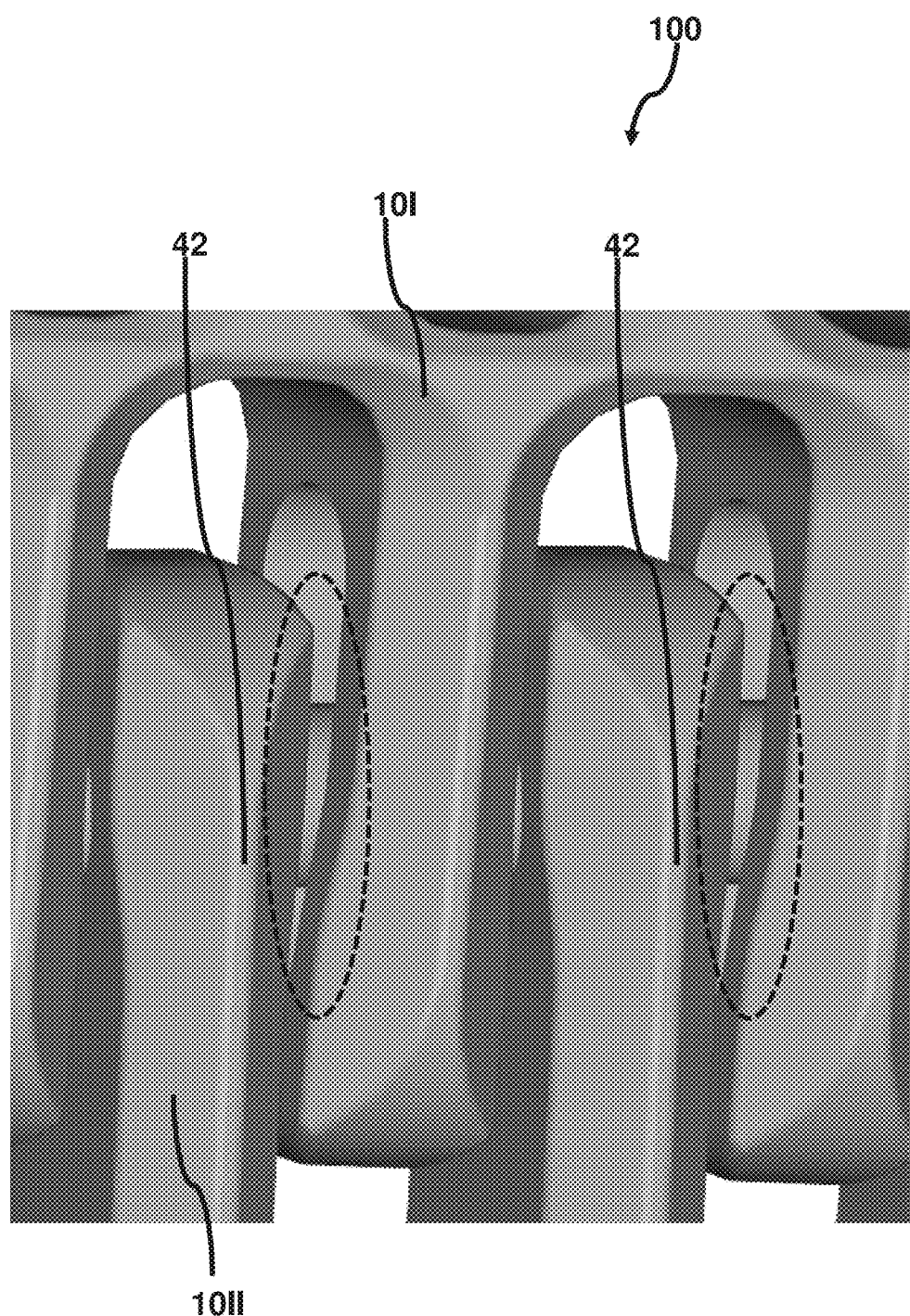
FIG. 4 illustrates how a water jet may clean the conveyor belt due to ridges.

The conveyor belt module part 10 shown in FIGS. 2-4 is adapted for being assembled into a modular side flexing conveyor belt 100 comprising a plurality of conveyor belt modules, see FIG. 3.

The conveyor belt module 10 shown in FIGS. 2-4 may have the eye parts in the first set of eye parts and the eye parts in the second set of eye parts being off-set with respect to each other, so that they can be brought to overlap when two similar or identical conveyor belt modules are oriented identically, and positioned so that their first axis and, respectively, second axis brought into a coaxial position and their positions along the coaxial direction is equal. The conveyor belt module 10 can thus form a row in a modular side flexing conveyor belt.

The conveyor belt module 10 shown in FIGS. 2-4 may be a modular conveyor link which is ready to form a single row in a side flexing conveyor. This is shown in FIG. 3.

The conveyor belt module 10 shown in FIGS. 2-4 comprises a central beam 12.

The conveyor belt module 10 shown in FIGS. 2-4 comprises a first set of eye parts extending from the beam 12. The first set of eye parts has along a first rod axis first apertures for receiving a rod. The conveyor belt module 10 shown in FIGS. 2-4 comprises a second set of eye parts extending from the beam 12 in an opposite direction to the first set of eye parts and being transversely off-set relative to the first set of eye parts. The second set of eye parts having along a second rod axis oblong apertures for receiving a rod. The second apertures are oblong, which enables the conveyor belt module 10 to be used in a side flexing belt.

A primary group of eye parts 40 from the first and second set of eye parts comprises on the load-carrying side 14 and on the underside 16 a ridge 42 extending along at least part of the eye parts 44 of the group of eye parts. This enables the conveyor belt module 10 to be cleaned better with a water jet as the ridge 42 creates a clearance best illustrated in FIG. 4 where the modular conveyor belt part 10 is used as part of a modular conveyor belt 100.

Figure 5:
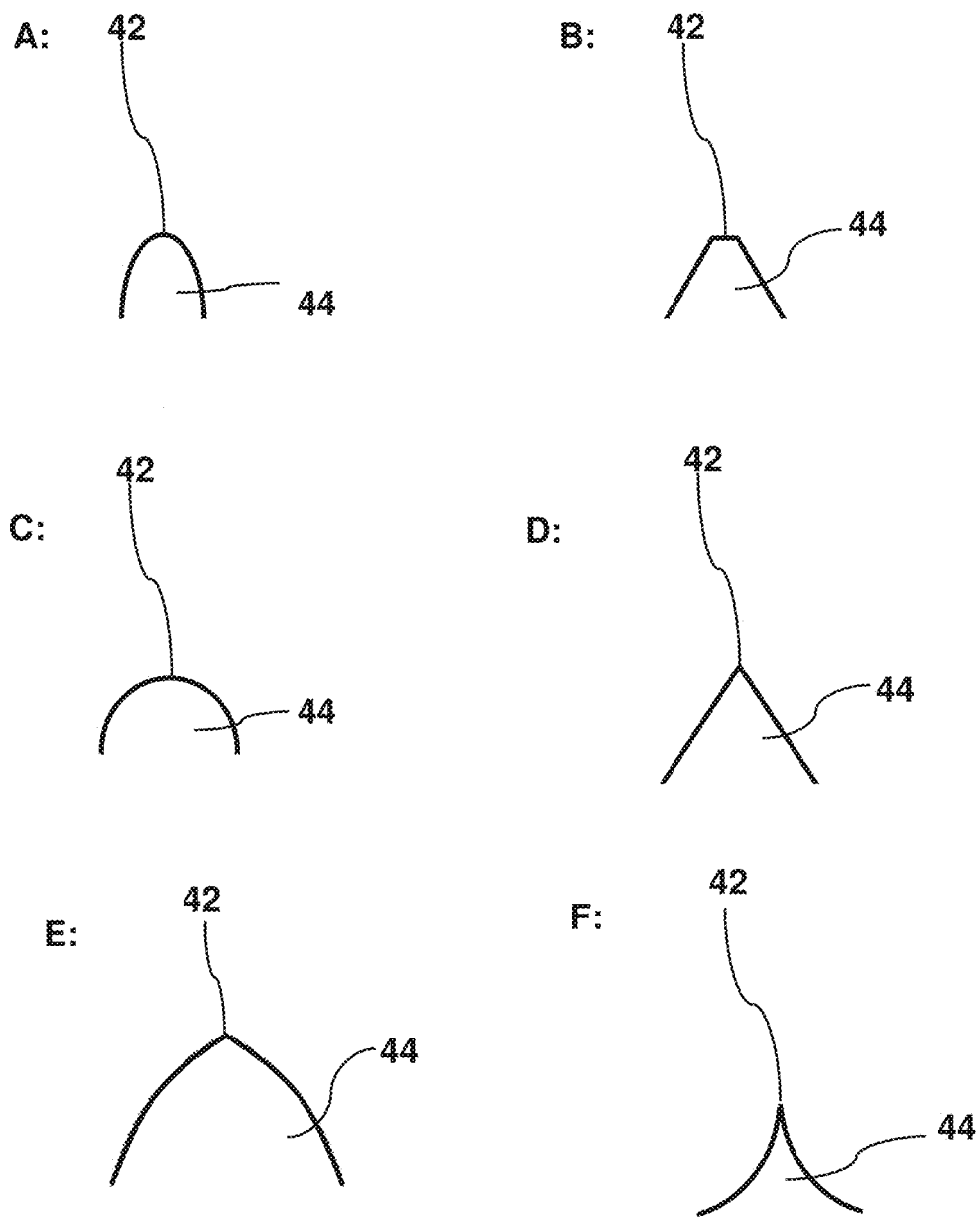
FIG. 5 illustrates a non-exhaustive list of possible ridges.

In the present embodiment the eye parts in the primary group of eye parts 40 have a tapered shape (such as with 45° sloped sides on either side of a central, vertical axis through the middle of the eye part in the cross-sectional view as depicted in FIG. 5). However, other shapes may also be used, see FIG. 5.

In subfigure C in FIG. 2 it is disclosed that the central beam 12 comprises on the load-carrying side 14 and (due to mirror symmetry) on the underside 16 a curved surface extending between one or more neighboring eye parts 40 with ridges 42.

The presented group of primary eye parts 40 is sandwiched between eye parts within a secondary group of eye parts having a flat surface on both the underside and on the load-carrying side.

FIG. 3 illustrates a conveyor belt 100 assembled by at least three conveyor belt module 10I, 10II, 10III.

The conveyor belt 100 is assembled using rods through coaxially aligned axes of eye parts of neighboring conveyor belt modules.

FIG. 4 illustrates how a water jet may clean the conveyor belt 100 due to the ridges 42 of the eye parts in the primary group 40 as the ridges 42 form a clearance marked by the dashed ellipses.

Thus a water jet may attack the conveyor belt 100 at an angle where the water jet unobstructed may enter the first and or second apertures. This may be especially possible when the apertures are oblong as shown in FIG. 4.

FIG. 5 illustrates a non-exhaustive list of possible shapes of ridges 42 for the different eye parts 44.

To sum up, there is presented a conveyor belt module for a side flexing modular conveyor belt wherein a width ratio between a longitudinal surface width and a maximum width of eye parts placed centrally along a longitudinal is smaller than a width ratio for eye parts placed on both sides of the centrally placed eye parts. There is furthermore presented a modular conveyor belt, a modular conveyor belt system, a method for conveying one or more elements and use of modular conveyor belt for conveying one or more elements.

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A conveyor belt module for a side flexing modular conveyor belt, said conveyor belt module comprising:
    a first set of eye parts defining a first axis, and
    a second set of eye parts defining a second axis,
wherein the eye parts comprise:
    a primary group of eye parts,
    a secondary group of eye parts, wherein the secondary group of eye parts comprises eye parts placed on both sides of the primary group of eye parts along an axis being parallel with the first axis and/or the second axis,
wherein, in a cross-sectional plane being orthogonal to a line being
    orthogonal to the first axis and/or the second axis, and
    intersecting both of the first axis and the second axis,
a first width ratio of any eye part is given as the ratio of:
    a width in a direction parallel with the first axis and/or the second axis of a surface of the eye part at a distal end in a first direction along an axis in the cross-sectional plane and being orthogonal to the first axis and/or the second axis, to
    a largest width in a direction parallel with the first axis and/or the second axis of the eye part,
and a second width ratio of any eye part is given as the ratio of:
    a width in a direction parallel with the first axis and/or the second axis of a surface of the eye part at a distal end in a second direction being orthogonal to the first direction, to
    the largest width in a direction parallel with the first axis and/or the second axis of the eye part,
and wherein a first width ratio and/or a second width ratio is smaller for eye parts within the primary group of eye parts compared to eye parts within the secondary group of eye parts.

2. The conveyor belt module according to claim 1, wherein a first distance is given for any eye part as a distance along an axis in the cross-sectional plane and being orthogonal to the first axis and/or the second axis between:
    the surface of the eye part at a distal end in the first direction, and
    the position of the largest width in a direction parallel with the first axis and/or the second axis of the eye part,
and a second distance is given for any eye part as a distance along an axis in the cross-sectional plane and being orthogonal to the first axis and/or the second axis between:
    the surface of the eye part at a distal end in the second direction, and
    the position of the largest width in a direction parallel with the first axis and/or the second axis of the eye part, and
wherein a first distance and/or a second distance is larger for eye parts within the primary group of eye parts compared to eye parts within the secondary group of eye parts.

3. The conveyor belt module according to claim 1, wherein a first distance is given for any eye part as a distance along an axis in the cross-sectional plane and being orthogonal to the first axis and/or the second axis between:
    the surface of the eye part at a distal end in the first direction, and
    the position of the largest width in a direction parallel with the first axis and/or the second axis of the eye part,
and a second distance is given for any eye part as a distance along an axis in the cross-sectional plane and being orthogonal to the first axis and/or the second axis between:
    the surface of the eye part at a distal end in the second direction, and
    the position of the largest width in a direction parallel with the first axis and/or the second axis of the eye part,
and wherein a first distance and/or a second distance for eye parts within the primary group of eye parts is equal to or larger than 1 mm.

4. The conveyor belt module according to claim 1, wherein one or more eye parts are attached to a central beam, and wherein a thickness of these one or more eye parts in a direction parallel with the first axis and/or the second axis of one or more of the eye parts attached to the central beam increases in a direction away from the central beam.

5. The conveyor belt module according to claim 1, wherein the conveyor belt module comprises central beam comprising
    a primary beam portion, and
    secondary beam portions, wherein the secondary beam portions are placed on both sides of the primary beam portion along an axis being parallel with the first axis and/or the second axis, and
wherein a first flat surface area and/or a second flat surface area per unit length in a direction parallel with the first axis and/or the second axis at a distal end in the first, respectively, second direction is larger for the secondary beam portions than for the primary beam portion.

6. The conveyor belt module according to claim 1, wherein one or both ends in the cross-sectional plane of eye parts in the primary group of eye parts has a shape chosen among the group comprising:
- a triangle, such as a symmetric or skewed triangle,
- a semi-circle,
- a quarter round,
- a pointed arch,
- an inflexed arch, and
- a polygon having more than three sides.

7. The conveyor belt module according to claim 1, wherein the primary group of eye parts occupies a primary distance of the conveyor belt module in a direction along the first axis and/or the second axis and towards the middle, wherein the primary distance is within 20-50 cm, and/or
- wherein the secondary groups of eye parts occupies a secondary distance from each side of the conveyor belt module in a direction along the first axis and/or the second axis and towards the middle,
- wherein the secondary distance is within 1-20 cm.

8. The conveyor belt module according to claim 1, wherein the conveyor belt module has rotational symmetry of second order about one or more of:
- an axis being parallel with the first axis and/or the second axis,
- an intersecting axis being orthogonal to the first axis and/or the second axis and intersecting both of the first axis and the second axis, and
- an axis being orthogonal to each of;
  - the axis being parallel with the first axis and/or the second axis, and
  - the intersecting axis being orthogonal to the first axis and/or the second axis and intersecting both of the first axis and the second axis.

9. A modular conveyor belt comprising a plurality of conveyor belt modules according to claim 1.

10. The modular conveyor belt according to claim 9 and being for conveying food products and/or sticky products-comprising non-packaged food products having animal protein including anyone of fish or meat or poultry.

11. A modular conveyor belt system comprising:
- the modular conveyor belt according to claim 9;
- rails or guides, for controlling a path of the modular conveyor belt; and
- an actuator arranged for driving the modular conveyor belt.

12. The modular conveyor belt system according to claim 11, wherein the modular conveyor belt system comprises a portion wherein the modular conveyor belt is side flexing.

13. A method for conveying one or more elements, said method comprising:
- placing the one or more elements on or at the modular conveyor belt according to claim 9, and
- conveying the one or more elements with the modular conveyor belt.

14. The method for conveying one or more elements according to claim 13, wherein said one or more elements comprise food products and/or sticky products comprising non-packaged food products-having animal protein-being anyone of fish or meat or poultry.

15. The modular conveyor belt according to claim 9 for conveying one or more elements comprising-food products and/or sticky products, the food products comprising-non-packaged food products comprising animal protein-being anyone of fish or meat or poultry.

* * * * *